M. C. ST. JOHN.
RUBBER PROPELLER.
APPLICATION FILED APR. 29, 1920.
1,360,596.
Patented Nov. 30, 1920.
2 SHEETS—SHEET 1.
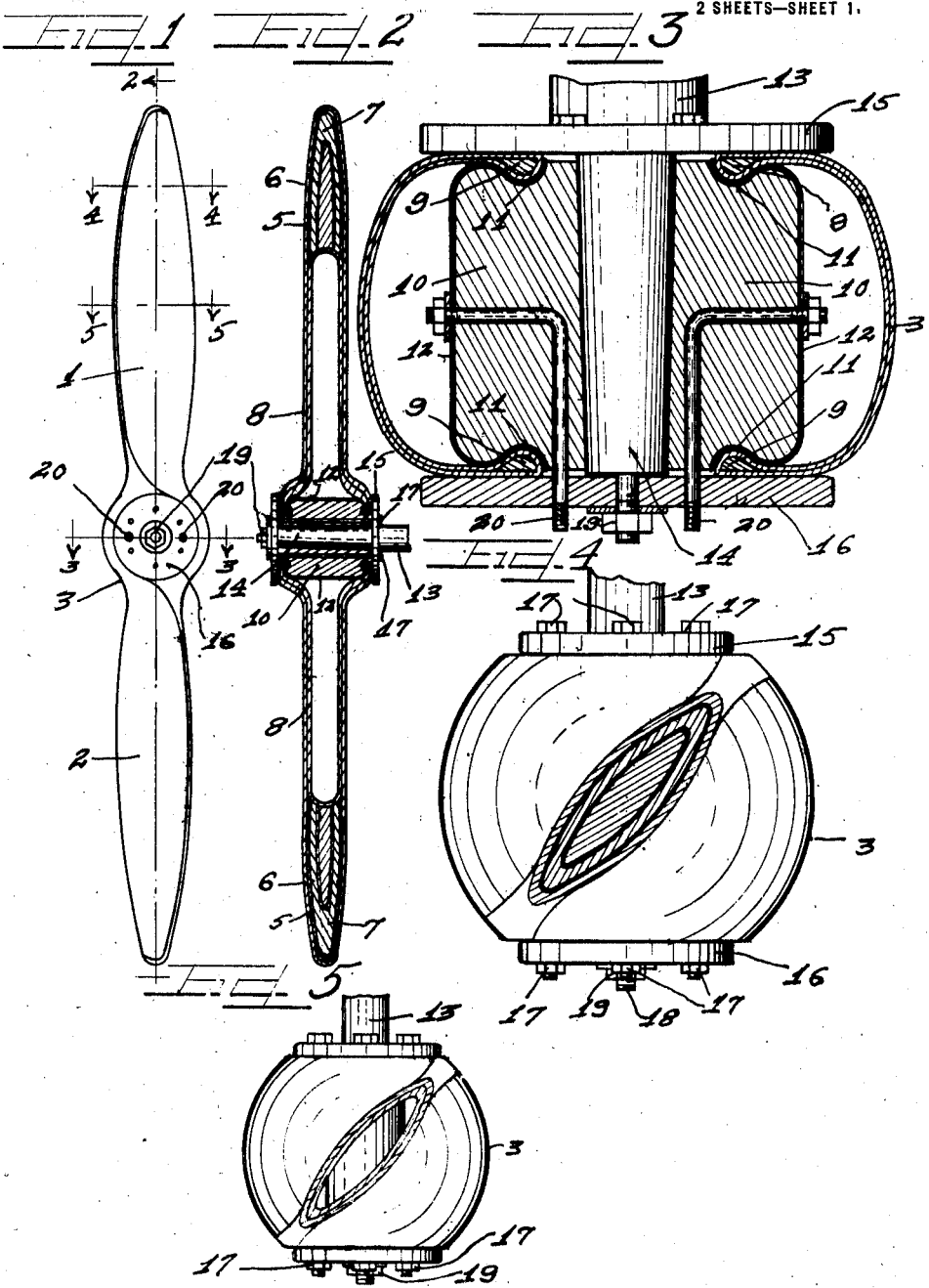
Witnesses
Rudolph J. Berg
Charles W. Filley Jr.
Inventor
Miles C. St. John.
By Charles W. Niles
Atty

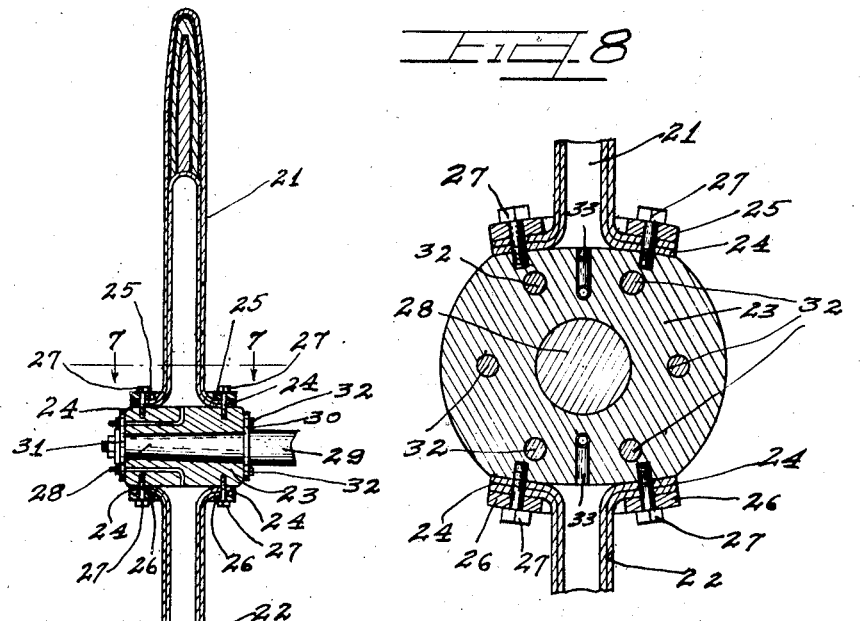

UNITED STATES PATENT OFFICE.

MILES C. ST. JOHN, OF CHICAGO, ILLINOIS.

RUBBER PROPELLER.

1,360,596.	Specification of Letters Patent.	Patented Nov. 30, 1920.

Application filed April 29, 1920. Serial No. 377,473.

*To all whom it may concern:*

Be it known that I, MILES C. ST. JOHN, a citizen of the United States, and a resident of the city of Chicago, in the county of Cook and State of Illinois, have invented certain new and useful Improvements in Rubber Propellers; and I do hereby declare that the following is a full, clear, and exact description of the same, reference being had to the accompanying drawings, and to the numerals of reference marked thereon, which form a part of this specification.

This invention relates to propellers and more particularly to propellers used for the propulsion of aerial vehicles. Due to the increasing scarcity of suitable wood for propellers for aerial vehicles it has become necessary to construct these propellers of some other material. In the construction of such propellers the factors of strength, durability, resistance to weather and lightness in weight, have to be considered. A certain resiliency in the propeller is desirable if such resiliency can be obtained without sacrificing strength in the propeller construction.

It is an object of this invention to provide a propeller for aerial vehicles having the outer casing thereof constructed from fabric and rubber vulcanized together.

It is another object of this invention to provide a propeller for aerial vehicles having an outer casing constructed of fabric and rubber vulcanized together and having an inner casing adapted to be inflated to a high pressure thereby adding strength and rigidity to the propeller construction.

It is also an object of this invention to provide a propeller for aerial vehicles the blades of which are adapted to be removed separately from the propeller hub.

It is a further object of this invention to provide a rubber propeller for aerial vehicles having valves in the hub thereof whereby air may be introduced into the interior of said propeller.

It is an important object of this invention to provide an inflated propeller for aerial vehicles constructed of fabric and rubber vulcanized together and having the outer surface thereof covered with weather resisting vulcanized rubber.

Other and further important objects of this invention will be apparent from the disclosures in the drawings and specification.

The invention (in a preferred form) is illustrated in the drawings and hereinafter more fully described.

On the drawings:

Figure 1 is a view in front elevation of a propeller for aerial vehicles embodying the principles of this invention.

Fig. 2 is a section on line 2—2 of Fig. 1.

Fig. 3 is a slightly enlarged section on line 3—3 of Fig. 1 with parts shown in elevation.

Fig. 4 is a section on line 4—4 of Fig. 1.

Fig. 5 is a section on line 5—5 of Fig. 1.

Fig. 6 is a longitudinal central section taken through a modified form of propeller for aerial vehicles embodying the principles of this invention.

Fig. 7 is a slightly enlarged section on line 7—7 of Fig. 6.

Fig. 8 is a section on line 8—8 of Fig. 7.

As shown on the drawings:

The propeller of this invention comprises in general the inflated blade portions 1 and 2 and the hub 3. Said blade and hub portions are integral and comprise an outer casing of vulcanized fabric and rubber 5 and an outer protecting covering of vulcanized rubber 6. The outer casing is constructed by the well known process used in the construction of rubber tires for motor vehicles, and the final vulcanization is effected in a mold of the shape of the final form of propeller required. The thickness of the casing at both the blade and tip portions may be varied to provide sufficient rigidity therefor. As clearly shown in Fig. 2, the tip portions 7 of the blade are preferably constructed of a solid vulcanized composition of fabric and rubber. In order to maintain the casing rigidly in the desired form, means are provided for inflating the same. A rubber bag 8 conforming to the general contour of the interior of the casing is placed therein. At the central or hub portion 3 of the casing an aperture is provided and in the periphery of the casing surrounding said aperture is formed an integral bead 9. Said beads are constructed similar to the beads used in the construction of the clencher type of ordinary pneumatic tires. As clearly shown in Figs. 2 and 3, a hub 10 is engaged in the aperture in the outer casing. Said hub 10 is provided with a circular groove 11 in each end thereof in which the beads 9 on the casing are engaged. To insure a tight fit between the casing and the hub, a gasket 12 is inserted therebetween. Said gasket 12 may be constructed of rubber or other resilient material. The hub 10 is secured in position on the tapered portion 14 of the drive shaft 13 of an aerial vehicle.

For securing the casing securely in position on the hub 10, apertured ring plates or bolt rings 15 and 16 are provided. Said plates 15 and 16 are firmly secured together by the bolts 17 extending through the hub 10. A stud bolt 18 secured centrally in the tapered portion of the shaft 14, is engaged through the central aperture in the plate 16 and provided with a nut 19, which may be tightened securely on the plate 16 or a washer thereon. For introducing air into the interior of the casing valved tubes 20 are provided leading from the plate 16 through the hub 10 into the interior of said casing.

In the modified form of construction, as shown in Figs. 6, 7 and 8, the blade portions 21 and 22 are adapted to be separately and removably secured to the hub 23. Said blade portions 21 and 22 are provided at their inner ends with outwardly extending integral flanges 24, and said flanges 24 are secured to the hub 23 by the apertured sleeve plates 25 and 26. Said apertured sleeve plates 25 and 26 have the machine screws 27 engaged through the apertures therein, through the flanges 24 and into tapped holes in the hub 23. For securing the hub 23 in position on the tapered portion 28 of the drive shaft 29, apertured plates 30 and 31 are provided. Said plates 30 and 31 are secured together by bolts 32 extending through the hub 23. The stud bolt 32ᵃ extending from the outer end of the shaft 28 aids in securing the plates 31 in position. Valved tubes 33 extend from the interior of the blade casings through the hub 23 to the interior of the blades. A gasket may be inserted between the blade portions and the hub if desired.

As clearly shown in Figs. 7 and 8, the hub 23 is so formed as to provide a symmetrical propeller contour with the blade portions 21 and 22. The tips of the blades of the propellers of this invention may be vulcanized to any degree of hardness desired and the edges of the blades may be filled out to any form desired and vulcanized to desired hardness in the same manner. Since the outer vulcanized coating of the propeller is not affected by the weather, a protecting coating for the propeller is unnecessary and a difficult problem of construction of propellers for aerial vehicles is thus solved. The inherent elasticity of the rubber and fabric construction make this propeller much more able to resist shocks than the wood propellers now in use.

The operation is as follows:

The hub 10 is forced on the tapered portion 14 of the drive shaft 3, the bolts 17 being inserted through the plate 15 and through the hub. The casing of the propeller of this invention is next engaged over the hub 10, the bead portions 9 being engaged in the grooves 11 therein. The gasket 12 is of course first placed between the hub and the casing. The plate 16 is then engaged over the bolts 17 and the nuts tightened thereon, the beads 9 on the casing thus being held firmly in position in the grooves 11 of the hub 10. The bolt 19 is now tightened on the stud 18 and the casing is secured in position on the hub. Inflation of the casing is effected through the valved tubes 20, which extend through the hub into the interior thereof. In the modified form of construction shown in Figs. 6, 7 and 8 the blades 21 and 22 may be separately removed from the hub 23. This is effected by the removal of the machine screws 27 therefrom. This feature of construction makes possible the replacement of damaged blade portions without replacement of the entire propeller casing. Also by this method of construction a plurality of blade casings may be secured to the hub portion 23, or the blade portions may be reversed, as for example, when the propeller is to be used on a pusher type airplane.

I am aware that numerous details of construction may be varied through a wide range without departing from the principles of this invention, and I do not therefore purpose limiting the patent granted otherwise than necessitated by the prior art.

I claim as my invention:

1. In a propeller for aerial vehicles, the combination with a hub, of a hollow casing composed of resilient materials, secured thereon, and means for introducing and maintaining air under high pressure in the interior of the casing.

2. A propeller of the class described comprising a hollow apertured casing constructed of vulcanized fabric and rubber, a hub engaged in the aperture in the casing, a gasket between the casing and the hub, and means for introducing and maintaining air under high pressure in the interior of the casing.

3. A propeller of the class described comprising a hollow formed casing, a hub secured centrally therein, and valved tubes engaged through the hub for introducing air under pressure into the interior of the casing.

4. The combination with a shaft of a hub non-rotatably secured thereto, an annular recess in each end of the hub, a hollow casing engaged over the hub, beads on the casing engaged in the recesses in the ends of the hub, plates on the shafts adjacent the ends of the hub outside the casing, means for securing said plates together whereby the casing is secured on the hub, and means extending from the periphery of the hub to the ends thereof whereby air may be introduced and maintained under pressure in the interior of the casing.

5. A propeller for aerial vehicles comprising a hub portion and a plurality of inflated blade portions removably secured thereto.

6. A propeller of the class described comprising a hub, and a formed inflated casing removably secured thereon.

7. In a device of the class described the combination with a hub, of valved tubes extending to the interior thereof, and a plurality of hollow blade portions removably secured to the hub over the inner ends of said tubes.

8. The combination with a hub of a plurality of hollow blade portions having integral flanges engaging the outer surface thereof, means associated with said flanges whereby said blade portions are secured to the hub, and means for introducing and maintaining air under pressure in the interior of said blade portions.

9. A propeller casing of the class described comprising interior portions of vulcanized fabric and rubber, and a surface coating of vulcanized rubber, said surface coating being vulcanized to varying degrees of hardness at different portions thereof.

10. A propeller of the class described comprising a formed hollow casing of vulcanized fabric and rubber, and means for inflating the same.

11. A device of the class described comprising a hub, a hollow casing secured thereon, said casing being formed from semi-resilient material to the desired propeller shape, and means associated with the hub whereby air under pressure may be introduced and maintained in the casing to add to the stability thereof.

12. In a propeller of the class described, the combination with a hub, of hollow resilient blade portions having flanges engaging the outer surface of said hub, apertured plates formed on the flanges, and means engaged through said flanges and plates into the hub whereby the said blade portions are removably secured thereon.

In testimony whereof I have hereunto subscribed my name in the presence of two subscribing witnesses.

MILES C. ST. JOHN.

Witnesses:
RIDSDALE ELLIS,
CARLTON HILLS.